Nov. 16, 1943.   T. F. MIKA   2,334,349
OIL SEAL CONSTRUCTION
Filed Oct. 29, 1941

Witness:
Chas. R. Koursh

INVENTOR.
Thomas F. Mika,
BY Parkinson & Lane
Attys.

Patented Nov. 16, 1943

2,334,349

UNITED STATES PATENT OFFICE 2,334,349

OIL SEAL CONSTRUCTION

Thomas F. Mika, Lombard, Ill., assignor to Victor Manufacturing & Gasket Company, Chicago, Ill., a corporation of Illinois Application October 29, 1941, Serial No. 416,982

2 Claims. (Cl. 288—3)

The present invention relates to an oil seal or grease retainer of the type adapted to seal the space encompassing and between a rotatable shaft and its surrounding housing against the passage or escape of oil, grease or other lubricants or fluids as well as dust and other foreign matter, and more especially to a novel supporting shell or retainer therefor.

The novel retaining shell comprises a pair of threaded members of a moldable plastic which when assembled, form a substantially channel-shaped retainer or mounting for a sealing member or diaphragm. The novel invention comprehends a simplified assembly but one in which the sealing member is securely held in place by pressure exerted by one of the threaded members clamping the sealing member between it and the other threaded member.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
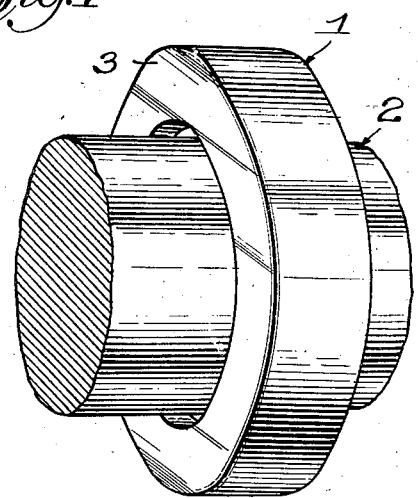
Figure 1 is a view in perspective of the oil seal encompassing a rotatable shaft, the circumference of the retaining shell being forced into and anchored in a surrounding housing.
Figure 2:
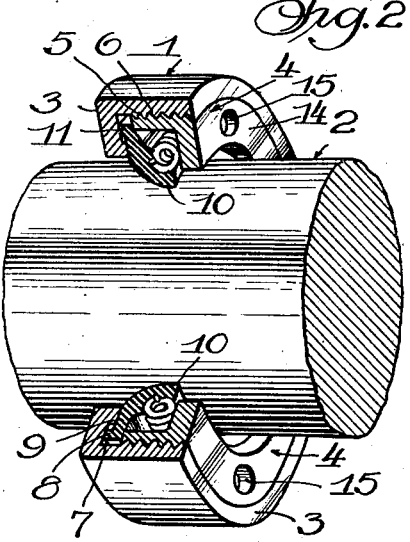
Figure 2 is a view in perspective of the oil seal with a portion thereof cut away to more clearly show the inner construction.
Figure 3:
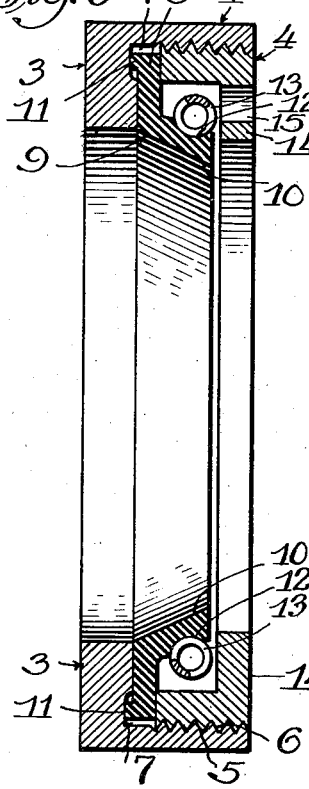
Figure 3 is a view in vertical cross section through the novel oil seal.
Figure 4:
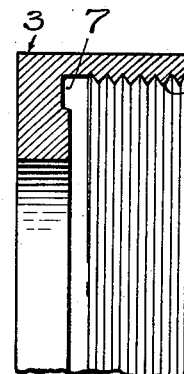
Figures 4, 5, 6 and 7 are fragmentary views in vertical cross section of the separate elements, which when assembled, form the novel oil seal.
Figure 5:
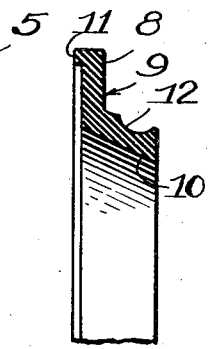
Figures 6, 7:
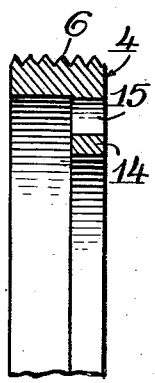
Figure 8:
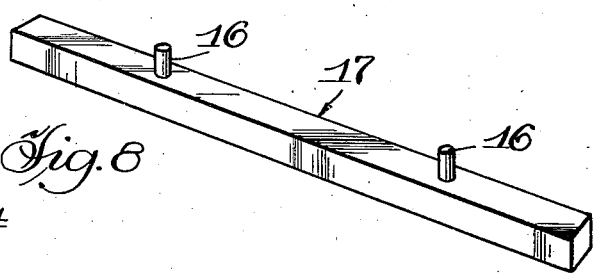
Figure 8 is a view in perspective of a key adapted to assemble and disassemble the oil seal.

Referring more particularly to the disclosure in the drawing, the novel oil seal 1 is shown in Figures 1 and 2 as surrounding a rotatable shaft 2 to provide an internal type of oil seal, although it is to be understood that the novel invention is equally applicable to an external type oil seal in which the parts are reversed and the retaining shell of the oil seal is mounted with a press fit upon the shaft 2 and sealing contact is had with the housing surrounding the shaft. The retaining shell comprises an outer substantially L-shaped channel 3 and an inner substantially L-shaped channel 4, the former being internally threaded at 5 and the latter externally threaded at 6 for threaded engagement to form an assembled, substantially channel-shaped retainer. The outer section 3 is provided with an annular groove 7.

Mounted between the sections 3 and 4 is a substantially radially extending flange 8 of a sealing member or diaphragm 9 provided with a sealing lip 10 adapted to have a wiping contact with the shaft 2. The radial portion 8 of the sealing member is provided adjacent its outer edge with an annular rib or shoulder 11 adapted to seat within the annular groove 7 and thereby locate this sealing member.

In order to maintain the sealing lip 10 in continuous wiping contact with the shaft 2, the rear surface of this lip is recessed at 12 for the reception of a contractile spring 13. This spring is retained in position by the shoulders or raised portions at the sides of the arcuate recess 12 and is prevented from being accidentally removed or displaced by the side wall 14 of the inner member 4.

In order to more expeditiously assemble and disassemble the oil seal construction, the side wall 14 of the inner member is provided with a pair of openings 15 positioned approximately 180° apart and which openings are adapted to receive the lugs or pins 16 on a key 17. This key permits the ready unscrewing of the inner section 4 or the ready assembly of this section and the retention of the sealing member 9 within the retaining shell by the pressure required.

The direction of the threaded joint should preferably be opposite to the torque of the shaft to be sealed, i. e., if the seal is intended for a shaft rotating in a clockwise direction, the threaded joint should preferably close in a counter-clockwise direction.

The threaded closure joint may be molded at the same time as the body of the channel sections, or this threaded joint may be formed later by any suitable means. The molding operation may be performed by the injection method which would be most economical as the threads could be produced in this operation. Or, the channel sections may be molded by the compression method and the threads produced later.

The channel sections may be molded out of a thermosetting or thermoplastic resin, or out of relatively hard, natural or any of the synthetic rubbers. Where a thermosetting resin is employed, it may be taken from its early stages into a stage of semi-set in injection molding presses and subsequently can be cured after the molding operation by subjecting it to oven heats.

Among the resins that may be employed are the following:

*Thermosetting*

Bakelite
Urea-formaldehyde
Melamine-formaldehyde

*Thermoplastic*

Cellulose acetate
Methyl methacrylate
Polystyrene
Shellac
Ethyl cellulose
Cumarone Having thus disclosed the invention, I claim:

1. A unitary and self-contained oil seal assembly comprising a channel-shaped retaining shell composed of a telescoping outer and inner substantially L-shaped section of molded plastic material having threaded engagement to provide a substantially channel-shaped assembly, an annular channel in the outer section, a resilient sealing element having a lip for wiping and sealing contact with a rotatable shaft, and a flange portion having an annular shoulder received and adjustably anchored in the annular channel in the outer section by threaded adjustment of the inner section to thereby anchor and maintain the sealing element against rotation in the shell.

2. In an oil seal or grease retainer adapted to be mounted as an assembled unit in a housing encompassing a rotatable shaft, a substantially channel-shaped retaining shell therefor comprising an inner and an outer section threaded for assembly, an annular channel provided in one of the sections, and a resilient sealing element having a radially extending flange provided with a shouldered portion secured within the annular channel of the retaining shell by pressure applied by the inner threaded section, the inner threaded section being readily adjustable to compensate for varying thicknesses of the shoulder portion and to assure retention of the sealing element and prevent its rotation in the shell.

THOMAS F. MIKA.